Oct. 11, 1949.  F. E. FREY  2,484,702
HYDRATION OF OLEFINS
Filed Feb. 10, 1944

INVENTOR
F. E. FREY
BY
Hudson, Young and Yinger
ATTORNEYS

Patented Oct. 11, 1949

2,484,702

UNITED STATES PATENT OFFICE 2,484,702

HYDRATION OF OLEFINS

Frederick E. Frey, Bartlesville, Okla., assignor to Phillips Petroleum Company, a corporation of Delaware Application February 10, 1944, Serial No. 521,833

8 Claims. (Cl. 260—640)

This invention relates to the preparation of alcohols by hydration of olefins and more particularly to preparation of such alcohols by hydration of olefins by the combined action of hydrogen fluoride and water.

The principal object of the present invention is to provide an improved method of hydrating aliphatic olefins to the corresponding alcohols. Another object is to provide a method of accomplishing such hydration smoothly and with a minimum of the objectionable effects noted when the conventional hydrating acid, sulfuric acid, is employed, such as polymerization, decomposition, etc. Another object is to provide a method of the foregoing type wherein the acid functions as a true catalyst for the hydration and is reusable over and over again.

Figure 1:
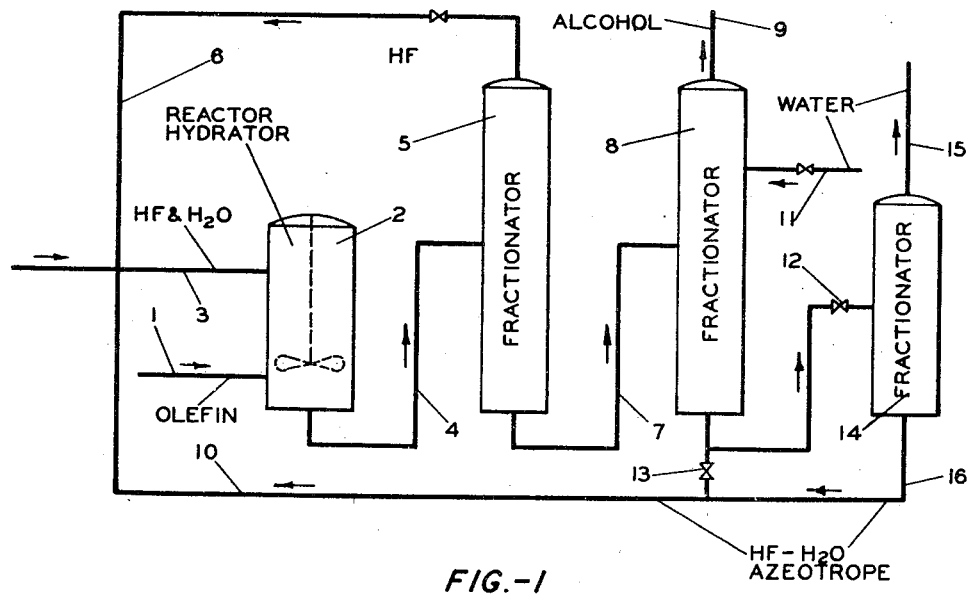
Figure 2:
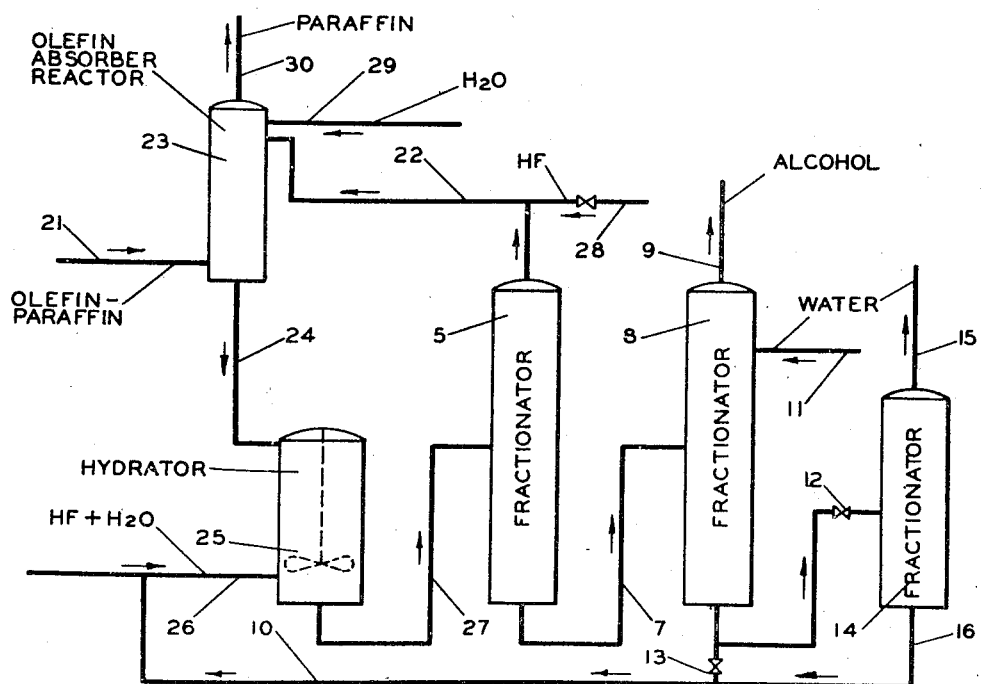

The accompanying drawing portrays diagrammatically two arrangements of equipment which can be used in carrying out this invention; Fig. 1 shows an arrangement wherein the postulated reaction between the olefin and HF to form the alkyl fluoride and hydration of the fluoride to the alcohol take place simultaneously; Fig. 2 shows preliminary formation of the alkyl fluoride and hydration thereof to the corresponding alcohol in a separate unit.

In accordance with the present invention, hydration of aliphatic olefins to the corresponding alcohols is effected by the action of hydrogen fluoride and water. The olefin may be subjected to the simultaneous action of hydrogen fluoride and water under such conditions that the alcohol is the principal reaction product. Alternatively, the olefin may be reacted with hydrogen fluoride, usually under anhydrous or nearly anhydrous conditions, whereby the alkyl fluoride is substantially the sole reaction product, and the fluoride so produced may be subsequently reacted with water in the presence of free hydrogen fluoride to effect conversion to the alcohol. Under some conditions, the olefin may be contacted with hydrogen fluoride and water in such amounts and under such conditions that the olefin is converted partly to the alcohol and partly to the fluoride. The reaction mixture so produced may be further treated to convert the fluoride contained therein to the alcohol, or the fluoride content may be recovered in any suitable way and separately converted to the alcohol by means of water as a hydrating agent in the presence of free hydrogen fluoride.

The alcohol is recovered from the reaction product in any suitable manner. A convenient method is to subject the reaction effluent to fractional distillation in a suitable fractionation system. For example, the effluent may be fractionally distilled in a first fractionator to recover an anhydrous overhead fraction comprising any excess of hydrogen fluoride over the constant-boiling proportion and a heavy fraction of the alcohol and a constant-boiling mixture of water and hydrogen fluoride, the latter fraction being fractionally distilled in a second fractionator to separate the alcohol from the constant-boiling mixture of water and HF. I have found in some cases that the alcohol is not sharply separated as an overhead product following elimination of what HF is recoverable with little contamination beforehand but that dilution with water will cause a sharp separation. Such added water can be partly or wholly eliminated as such in a subsequent distillation step. The hydrogen fluoride and the azeotrope are recycled to appropriate points in the alcohol-forming system.

The invention is applicable to the hydration of aliphatic olefins, usually the lower aliphatic olefins and frequently the olefins having from 2 to 5 carbon atoms per molecule; namely, ethylene, propylene, butene-1, butenes-2, isobutylene and the various amylenes. The olefin may be in admixture with other hydrocarbons, usually paraffins, which are inert.

In its usual form, the process of the present invention involves effecting hydration of olefins to alcohols by aqueous hydrofluoric acid as a hydrating medium or catalyst. Hydrofluoric acid having a concentration in the range of about 10 to 70 per cent or higher is effective. Solutions of 40 to 50 per cent are generally preferred. The optimum concentration varies with other conditions of the hydration and for any particular case may be readily determined by trial or by a consideration of the reaction temperature and the olefin species. The temperature ordinarily varies within the range of 0° C. to 250° C., but it may be outside this range in particular cases. The pressure is not especially critical and depends upon the temperature and upon the olefin. The pressure may be such that olefin is in either gaseous or liquid phase.

The process of the invention may be carried out in either batchwise manner or continuously. In batch-type operation, the olefin and the hydrofluoric acid are passed into a suitable reaction vessel, and the mixture is thoroughly agitated and maintained at suitable temperature and pressure until the reaction is substantially complete. At the close of the reaction period, the liquid is withdrawn, and the alcohol is separated and concentrated, as by fractional distillation.

In continuous hydration, the olefin or an olefin-containing gaseous mixture is dispersed in the hydrating liquid in any suitable reaction vessel, for example, by contacting the gas countercurrently with the liquid. After a suitable reaction time, the liquid is withdrawn from the reactor, and the alcohol is separated from the hydrating liquid by suitable means. The alcohol may be concentrated or purified and is withdrawn as a product of the process, and the hydrating acid is recycled to the reactor.

The preferred temperature ranges from 75 to 200° C. By use of elevated temperature and pressure, the reaction can be accelerated, and the yield can be improved, especially in the hydration of ethylene, for which the temperature may be as high as 200° C. or higher. When the olefin is preliminarily absorbed in the acid, concentrations of HF above the approximately 40 per cent figure for the azeotrope are employed, ranging up to 70 per cent or even up to 95 per cent or higher, up to the anhydrous form; the hydration of the olefin or of the fluoride is then conducted with lower acid strengths. After the hydrolysis, any unreacted olefin and/or unhydrolyzed alkyl fluoride may be removed from the reaction mixture in a first fractional distillation zone, and may be recycled to the hydrolysis step, accompanied in some instances by some HF. A second fractional distillation separates the azeotrope of HF and water from the alcohol, the azeotrope being recycled to the hydrolysis step and the alcohol being withdrawn as a product of the process. When the alcohol itself forms an azeotrope, as with HF, or with HF and water, additional steps or other modifications to be described may be practiced in order to obtain the alcohol in substantially pure form.

With tertiary base olefins such as isobutylene and isoamylene, relatively lower acid strengths (constant-boiling or weaker) are optimum for the hydrofluorination step, and accordingly the fractionation or recovery process may consist of only one fractional distillation zone. Water, the azeotrope, or the alcohol may be the first to be distilled overhead, depending upon the proportions and the boiling points of these various components under the conditions prevalent in the distillation zone. By "constant-boiling" I refer to the constant-boiling mixture of HF and water at atmospheric pressure.

When hydrofluorination of the olefin is followed by hydrolysis of the fluoride in a separate step, the olefin and the HF react rapidly at ordinary or slightly elevated temperatures to give the alkyl fluoride without excessive polymerization, especially in the absence of a heavy layer of acid. To prevent excessive formation of polymers in either step, the hydrogen fluoride is preferably limited to between about one and about ten times that required stoichiometrically for the hydrofluorination of the olefin. For most olefins, a mol ratio of HF to olefin of about 4:1, or slightly more, is a good over-all choice. When it is desired to absorb olefin selectively from undesired inert diluents, hydrogen fluoride may be used as absorption liquid in the presence of a little water to retard polymerization, and if water or highly aqueous HF is brought into contact with inert effluent first it performs the additional function of recovering HF carried away from the olefin-absorption step.

Alternatively, the hydrofluorination of the olefin may be conducted in the same way as the first step of the processes disclosed in my copending applications, Serial No. 429,962, filed February 7, 1942, now Patent 2,384,735, issued September 11, 1945, and Serial No. 433,204, filed March 3, 1942, now Patent 2,384,736, issued September 11, 1945. In the first mentioned application, a liquid hydrocarbon material containing low-boiling olefins to be reacted and undesired inert hydrocarbons is contacted with liquid concentrated HF at a temperature ranging from 30 to 150° F. and with a ratio of HF to olefin by weight between about 10:1 and 50:1 to dissolve the olefins in the hydrofluoric acid, whereupon the hydrofluoric acid phase is separated. This contains the olefin as the alkyl fluoride, which is then hydrolyzed in accordance with the present invention. In the second application, the extraction of the olefin is conducted with the olefin-containing hydrocarbon stream in gaseous phase.

The molar ratio of HF to olefin employed in carrying out the present invention may vary within wide limits. Usually it will lie within the range of 0.5 to 10. Ordinarily, for complete reaction it is preferred that this ratio be greater than 1.

Referring to the drawing and first to Fig. 1, the olefin-containing feed enters reactor-hydrator 2 via line 1. HF and water in the proper proportions and amounts are fed via line 3. The reaction effluent passes via line 4 to fractionator 5, where HF in excess of the azeotrope, accompanied sometimes by alkyl fluoride, is removed and recycled via line 6, the mixture of alcohol and the azeotrope passing via line 7 to fractionator 8 where the alcohol is taken off at one point depending upon its boiling point, as overhead via line 9, while the azeotrope is taken off at another point, for example, as bottoms via valve 13 and line 10 for recycle. In cases wherein strong acid suppresses the preferential volatilization of the alcohol in fractionator 8, water may be introduced through line 11 to cause the alcohol to distill overhead. With valve 12 open and valve 13 closed, elimination of such added water can be effected by fractionator 14. When fractionator 14 is used the water goes overhead via line 15 and the azeotrope forms the bottoms product which leaves via line 16. It will be understood that the fractionation is shown purely diagrammatically and that suitable provision is made for recovery of any inert hydrocarbon in the olefin feed, unchanged olefin, alkyl fluoride, heavy materials formed in the reaction, etc.

In Fig. 2, the olefin and concentrated or substantially anhydrous or anhydrous HF are fed via lines 21 and 22 respectively, to absorber reactor 23. The resulting alkyl fluoride-containing mixture passes via line 24 to hydrator 25, whereinto water and free HF are introduced via line 26 as required. The reaction mixture thus formed passes via line 27 to a fractionation system as in Fig. 1. Fresh HF may be supplied to line 22 via line 28 as desired. Water, which may contain HF in a proportion so limited that it exerts a negligible partial pressure, may be introduced through line 29 to prevent loss of HF with paraffins or other diluents discharged through pipe 30. Such water retards polymerization, but should not be added in so great amount as to drive alkyl fluorides out of solution, for which reason only one part of water for 4–20 parts of HF in the absorber is permissible.

The following nonlimiting specific examples will serve to illustrate the practice of the present invention.

Example 1

A mixture composed of 15 cc. of 2-methyl-2-butene and 4 grams of 40 per cent hydrofluoric acid was placed in a copper vessel; it was kept at ice temperature for 13 days. At the end of this time, the mixture was distilled. Some unchanged 2-methyl-2-butene, about 4.5 cc., was recovered. The remainder of the product was a liquid which was found by analysis to be 2-methyl-2-butanol. The predominant reaction of hydrofluoric acid on 2-methyl-2-butene was thus found to be alcohol formation. The molar ratio of HF to olefin in this example was 0.562.

Examples 2 to 5

Four batch-type runs were made for the hydration of propylene by aqueous hydrofluoric acid of various concentrations. A mixture of 260 grams of the acid and about 45 grams of propylene of an estimated purity of 95 per cent was prepared in a "Monel" reactor at subatmospheric temperature. The reactor was closed and attached to a mechanical rocker for vigorous shaking, and its temperature was increased. Readings of the temperature and of the pressure were made every five minutes. From the data thus obtained, the temperature at which the pressure reversed its trend of increasing with increasing temperature was determined; this temperature was considered to be approximately that at which hydration began. The reaction time and the temperature subsequent to this point, until the pressure decreased to a constant value, are given in the following tabulation. The reaction mixture was cooled, and any gas was removed for analysis. The acid was neutralized with caustic alkali, and the resulting liquid mixture was examined and analyzed.

| Example No. | 2 | 3 | 4 | 5 |
|---|---|---|---|---|
| HF concentration, wt. per cent | 40 | 50 | 60 | 70 |
| Propylene, grams | 47.9 | 44.9 | 47.2 | 44.6 |
| Molar Ratio, HF to Propylene | 4.6 | 6.1 | 6.9 | 8.6 |
| Temp., °C | 99–119 | 71–90 | 53–97 | 22–55 |
| Maximum pressure, p. s. i. | 690 | 370 | 235 | 90 |
| Reaction time, min | 75 | 70 | 60 | 60 |
| Products: | | | | |
| Gas, grams | 5.0 | 4.0 | 5.5 | 7.5 |
| Composition, mol per cent— | | | | |
| Propylene | | 20.8 | 2.2 | |
| Propane | | 41.8 | 41.3 | |
| Isopropyl fluoride | | 37.4 | 56.5 | |
| Isopropyl alcohol, grams | 34.5 | 28.3 | 19.6 | 18.3 |
| Polymer, grams | 2 | 2 | 4–5 | 2–3 |
| Yield of isopropyl alcohol, per cent of theoretical yield | 50 | 44 | 29 | 29 |

Examples 6 to 8

Three batch-type runs were made for the hydration of isobutylene in the same general manner described for Examples 2 to 5. The following tabulation summarizes the data obtained:

| Example | 6 | 7 | 8 |
|---|---|---|---|
| HF Concentration, wt. percent | 10 | 20 | 40 |
| Isobutylene, grams | 44.6 | 47.5 | 46.4 |
| Mol ratio, HF: isobutylene | 1.6 | 3.1 | 6.3 |
| Temp., °C | 76–97 | 66–89 | 23–45 |
| Maximum pressure, p. s. i. | 159 | 116 | 34 |
| Reaction time, min | 50 | 40 | 40 |
| Yield of alcohol, percent of theor | 62 | 65 | 61 |

Examples 9 to 12

Four batch-type runs were made for the hydration of ethylene to ethyl alcohol in the same general manner described for Examples 2 to 5. The following tabulation summarizes the data obtained:

| Example | 9 | 10 | 11 | 12 |
|---|---|---|---|---|
| HF concentration, wt. percent | 40 | 50 | 60 | 70 |
| Ethylene, grams | 19 | 20 | 27.7 | 40.8 |
| Mol ratio, HF: ethylene | 7.7 | 9.1 | 7.9 | 6.3 |
| Temp., °C | 221–253 | 185–218 | 143–181 | 114–153 |
| Maximum pressure, p. s. i. | 810 | 635 | 735 | 835 |
| Reaction time, min | 60 | 70 | 120 | 140 |
| Yield of ethyl alcohol, percent of theor | 39 | 38 | 29 | 25 |

Examples 13 to 18

Six batch-type runs were made for the hydration of butene-2 in the same general manner described for Examples 2 to 5. The following tabulation summarizes the data obtained:

| Example | 13 | 14 | 15 | 16 | 17 | 18 |
|---|---|---|---|---|---|---|
| HF concentration, wt. percent | 40 | 40 | 50 | 60 | 60 | 70 |
| Butene-2, grams | 46 | 48 | 44.7 | 47.8 | 63.7 | 46.3 |
| Mol ratio, HF: butene-2 | 4.8 | 4.6 | 6.1 | 6.9 | 5.2 | 8.3 |
| Temp., °C | 113–150 | 118–129 | 89–104 | 69–102 | 79–94 | 51–71 |
| Maximum pressure, p. s. i. | 260 | 280 | 146 | 40 | 91 | 33 |
| Reaction time, min | 40 | 20 | 20 | 40 | 20 | 20 |
| Yield of alcohol, percent of theor | 10 | 35 | 38 | 21 | 35 | 11 |

It will be understood that the foregoing examples are primarily illustrative only and that the conditions used in them should not be applied in an unduly limitative manner. Since the invention may be practiced otherwise than as specifically described, and since many modifications and variations of it will be apparent to those skilled in the art, this invention should be limited only in accordance with the appended claims.

I claim:

1. A process for preparing an aliphatic alcohol which comprises intimately contacting the corresponding olefin in a reaction zone with a solution consisting of hydrogen fluoride and water and containing from 10 to 70 weight per cent hydrogen fluoride, controlling the quantity of solution and olefin present in the reaction zone so as to maintain a molecular ratio of hydrogen fluoride to olefin 1:1 to 10:1, maintaining the temperature of the olefin and solution in the range from 0° to 250° C. for a time sufficient to convert olefin to alcohol, and recovering from effluents of said reaction zone an aliphatic alcohol so produced.

2. A process for preparing an aliphatic alcohol which comprises intimately contacting in an absorption-reaction zone a mixture consisting of the corresponding olefin and inert diluent material with a solution consisting of hydrogen fluoride and water in which the concentration of water is from 5 to 60 weight per cent and the amount of said solution relative to said olefin is such that the stoichiometric ratio of HF to said olefin is between 1:1 and 10:1, maintaining the temperature in the absorption-reaction zone between 0° and 250° C. absorbing the olefin from the olefin-diluent mixture into said hydrogen fluoride solution, whereby the olefin is converted to an intermediate alkyl fluoride, passing the resulting alkyl fluoride containing mixture to a hydration zone, there increasing the water content of the liquid to from 60 to 90 weight per cent and maintaining a reaction temperature between 75 and 200° C. for a reaction time such that the alkyl fluoride is hydrolyzed to the corresponding alcohol, and recovering the alcohol from the resulting reaction mixture.

3. A process for preparing ethyl alcohol which comprises intimately contacting ethylene with a solution consisting of hydrogen fluoride and water, maintaining the hydrogen fluoride content of said solution between 10 and 40 weight per cent and the amount of said solution relative to ethylene such that the stoichiometric ratio of HF to ethylene is between 1:1 and 10:1, maintaining the temperature of the ethylene and said solution in the range from 0° and 250° C. for a time sufficient to convert ethylene to ethyl alcohol, and recovering ethyl alcohol from the resulting reaction mixture.

4. A process for preparing isopropyl alcohol which comprises intimately contacting propylene with a solution consisting of hydrogen fluoride and water, maintaining the hydrogen fluoride content of said solution between 10 and 40 weight per cent and the amount of said solution relative to propylene such that the stochiometric ratio of HF to propylene is between 1:1 and 10:1, maintaining the temperature of the propylene and solution in the range from 0° and 250° C. for a reaction period between 20 and 140 minutes to convert propylene to isopropyl alcohol, and recovering isopropyl alcohol from the resulting reaction mixture.

5. A process for preparing butyl alcohol which comprises intimately contacting a butylene with a solution consisting of hydrogen fluoride and water, maintaining the hydrogen fluoride content of said solution between 10 and 40 weight per cent and the amount of said solution relative to butylene such that the stoichiometric ratio of HF to butylene is between 1:1 and 10:1, maintaining the temperature of the solution and butylene in contact therewith in the range from 0° to 250° C. for a time sufficient to convert butylene to butyl alcohol, and recovering butyl alcohol from the resulting reaction mixture.

6. A process for preparing butyl alcohol which comprises intimately contacting isobutylene with a solution consisting of hydrogen fluoride and water, maintaining the hydrogen fluoride content of the solution between 10 and 40 weight per cent and the amount of said solution relative to butylene such that the stoichiometric ratio of HF to butylene is between 1:1 and 10:1, maintaining the temperature of the solution and isobutylene between 0° and 250° C. for a time sufficient to convert butylene to butyl alcohol, and recovering butyl alcohol from the resulting reaction mixture.

7. A process for preparing an aliphatic alcohol having from 2 to 5 carbon atoms per molecule which comprises intimately contacting a corresponding aliphatic olefin with a solution consisting of hydrogen fluoride and water, maintaining the hydrogen fluoride content of said solution in the range from 10 to 40 weight per cent and the amount of said solution relative to said olefin such that the stoichiometric ratio of HF to said olefin is between 1:1 and 10:1, maintaining the temperature of said solution and olefin in the range from 0° to 250° C. for a time sufficient to convert said olefin to an alcohol, and recovering the aliphatic alcohol from the resulting reaction mixture.

8. The process of preparing an aliphatic alcohol, which comprises subjecting a material of the class consisting of the corresponding olefin and the corresponding alkyl fluoride to the action of an aqueous solution consisting of hydrogen fluoride dissolved in water and containing between 10 to 40 weight per cent of hydrogen fluoride and stoichiometric ratio of hydrogen fluoride to said material between 1:1 and 10:1, at a reaction temperature between 75° and 200° C., for a reaction period sufficient to effect production of an alcohol, and recovering an aliphatic alcohol so produced.

FREDERICK E. FRY.

REFERENCES CITED

The following references are of record in the file of this patent:

UNITED STATES PATENTS

| Number | Name | Date |
|---|---|---|
| 1,438,123 | McElroy | Dec. 5, 1922 |
| 2,014,740 | Larson | Sept. 17, 1935 |
| 2,135,455 | Loder | Nov. 1, 1938 |
| 2,392,048 | Kassell | Jan. 1, 1946 |

FOREIGN PATENTS

| Number | Country | Date |
|---|---|---|
| 605,988 | France | June 4, 1926 |

OTHER REFERENCES

Grosse et al., "Journal of Organic Chemistry," vol. 3, pages 26–32 (1938).

Fredenhagen, "Zeitschrift fur Physikalische Chemie," vol. 164A, pages 187–200.